Patented July 11, 1939

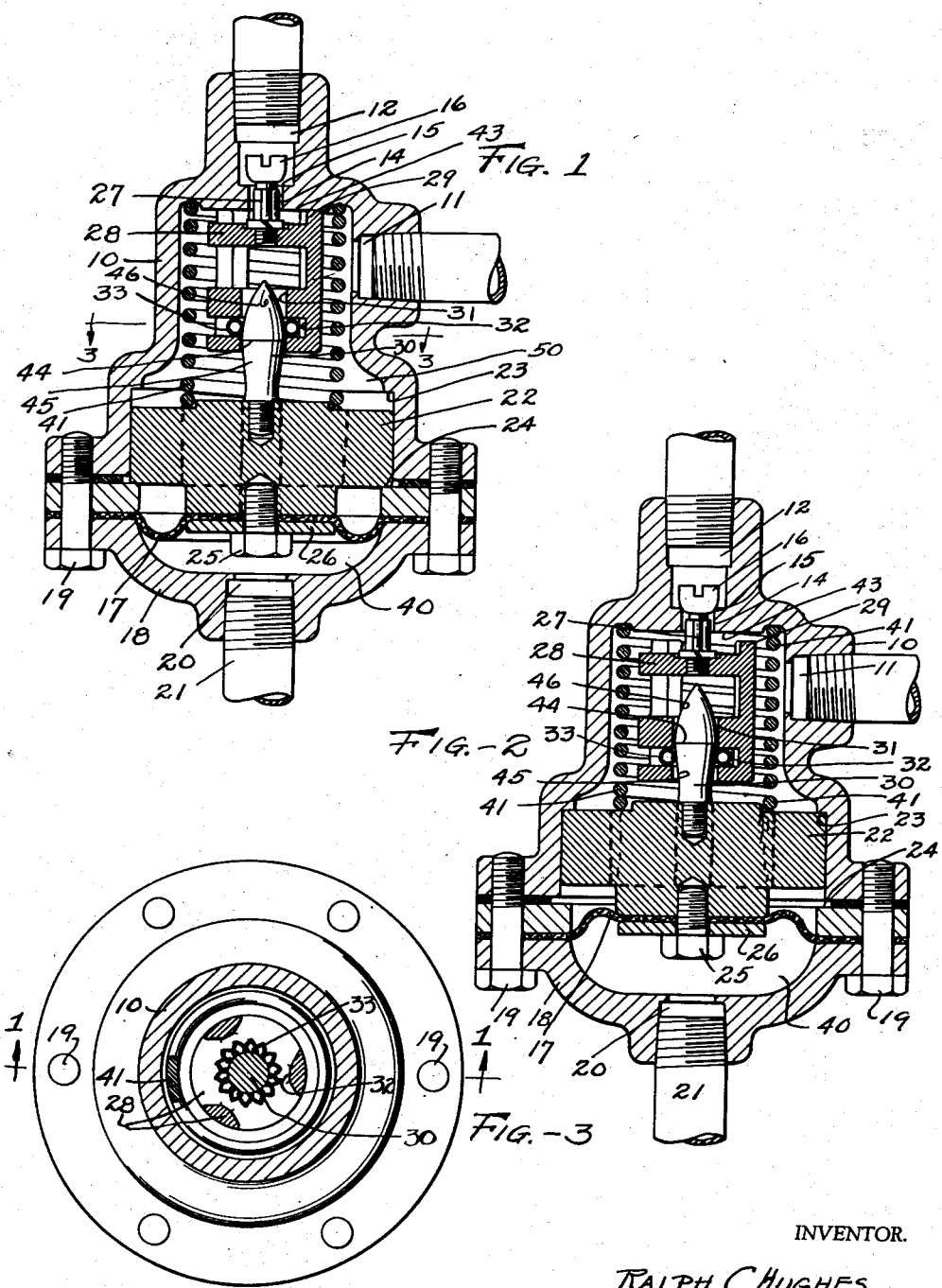

2,165,267

UNITED STATES PATENT OFFICE 2,165,267

PRESSURE ACTUATED VALVE

Ralph C. Hughes, Anderson, Ind., assignor to Reynolds Gas Regulator Co., Anderson, Ind., a corporation of Indiana Application September 4, 1936, Serial No. 99,395

2 Claims. (Cl. 137—153)

This invention relates to an improved pressure actuated valve and particularly to a valve which is adapted to permit full flow of a gas through a conduit until the pressure from an independent source reaches a predetermined maximum, at which time the valve will close, to open to full open position when the pressure in such independent source drops to a predetermined minimum. These therefore are the general objects of the present invention.

Another object of this invention is to provide a snap acting pressure controlled valve which will be of a simple construction, capable of being manufactured at a low cost, and at the same time will be reliable in its operation over long periods of time.

Other objects of the present invention will become more apparent from the following description, reference being had to a preferred embodiment of the invention illustrated in the accompanying drawing. The essential features of the invention will be summarized in the claims.

Referring now to the drawing, wherein I have illustrated a valve constructed in accordance with my invention—

Fig. 1 is a centrally located vertical section as indicated by the lines 1—1 on Fig. 3, and illustrates my improved valve mechanism in an open position;

Fig. 2 is a section taken in the same plane as Fig. 1, but illustrating the valve mechanism in a closed position;

And Fig. 3 is a horizontal section as indicated by the lines 3—3 on Fig. 1.

Referring again to the drawing it will be seen that my improved valve comprises a hollow body 10 having an inlet opening 11 and an outlet opening 12 which are separated by a wall which is provided with a valve opening 14, provided with the usual valve seat 15. A valve member 16, supported as hereinafter described, coacts with the seat to regulate the flow of gas from the inlet to the outlet openings of the valve body.

The lower end of the valve body is closed by a diaphragm 17 made of a flexible material, as for instance, sheep skin which has been impregnated in the usual manner to render it impervious to gas. The diaphragm is secured in position against the walls of the valve body by a hollow cap 18 which is secured to the valve body by suitable bolts 19.

The cap 18 is provided with an inlet opening 20 adapted to receive a conduit 21 to apply gas pressure to the lower side of the diaphragm from a source independent of the source leading to or from the valve body or, if desired from the pressure leading from the outlet opening 12.

Slidingly mounted in the body 10 is a cross or wing 22. The travel of this wing is restricted by shoulders 23 and 24 which coact with the top and bottom surfaces, respectively, of the wing. The wing is secured to the diaphragm by a stud 25, a washer 26 protecting the diaphragm in the usual manner.

The valve member 16 is provided with a stem 27 which is secured to a cage 28 as for instance by suitable screw-threads. When the valve is open, as illustrated in Fig. 1, suitable legs 29 which extend upwardly from the cage 28, permit the free passage of gas from the inlet to the outlet opening of the valve.

The valve mechanism is so arranged that an upward movement of the diaphragm draws the valve member downwardly onto its seat, whereas a downward movement of the diaphragm raises the valve member from its seat.

Secured to and extending upwardly from the wing 21 is a cam shaped prong or cam 30 which slidingly enters an axial opening 31 in the cage 28. The walls of this opening, intermediate its ends, are undercut to form an annular recess 32, within which is an endless coil spring 33, the ends of which have been secured together by welding or any other well known process to form a ring having a normal internal diameter which is less than the diameter of the prong 30 at its central region.

Assuming the valve to be in an open position, the various parts of the valve will be in the positions illustrated in Fig. 1. When the pressure in the chamber 40, below the diaphragm, is sufficient to counteract the pressure of the spring 41 which is interposed between the wing 22 and the upper wall 43 of the valve body, the prong 30 will start to move upwardly. When the thickest region 44 of the prong 30 reaches a point slightly above the horizontal center of the coil spring 33, the latter being under tension will follow the inwardly sloping portions 45 of the prong and snap the cage together with the valve member downward onto its seat, thereby closing the valve.

From the foregoing description it will be seen that I have provided a simple snap action valve which may be automatically controlled from a source of pressure independent of the pressure in the line flowing through the valve itself.

Having set forth the principles of my invention, and described and illustrated an embodiment thereof for practical use, what I claim and desire to secure by Letters Patent, is:

1. A pressure responsive valve comprising a valve body having inlet and outlet passages separated by a wall having a valve opening, a valve member adapted to open or close said opening, a stem secured to said valve member having an axially extending opening therein, a pressure responsive diaphragm, a cross mounted for vertical movement on said body and secured to said diaphragm, an axially extending cam carried by said cross and slidably extending into the opening in said stem, said cross acting to guide said cam for movement in an axial direction, means independent of said diaphragm and said valve member to limit the movement of said cross, resilient means carried by said stem intermediate the ends of the opening therein and adapted and arranged to coact with said cam to move the valve member relative to said diaphragm, said cam coacting with the walls of the axial opening in said stem to guide the movement of said stem, and wherein said cam is arranged and adapted to permit a limited universal movement of said valve member to thereby insure seating of said valve.

2. In a pressure responsive valve, a hollow body having inlet and outlet openings separated by a valve seat, a diaphragm closing the lower end of said body and secured thereto by a hollow cap having an inlet opening to admit fluid pressure to the lower side of said diaphragm, a wing slidably mounted in said body above the diaphragm and guided for vertical movement by the walls of said diaphragm, shoulders formed in said body to restrict the movement of said wing, means to secure said wing to said diaphragm, a valve member to coact with said seat and carried by a cage, a prong secured to and extending upwardly from said wing into said valve member, said valve member having an annular recess, an endless coil spring in said recess and forming a ring embracing said prong, whereby said valve member may be moved relative to the diaphragm consequent upon a predetermined movement of the diaphragm relative to the valve member.

RALPH C. HUGHES.